(12) United States Patent
Wu et al.

(10) Patent No.: US 9,869,945 B2
(45) Date of Patent: Jan. 16, 2018

(54) ELECTROSTATIC CHARGING MEMBER

(71) Applicant: Xerox Corporation, Norwalk, CT (US)

(72) Inventors: Jin Wu, Pittsford, NY (US);
Christopher D. Blair, Webster, NY (US); Xiaolu Wen, Brooklyn, NY (US); Amy C. Porter, Pittsford, NY (US); Lin Ma, Pittsford, NY (US); Lanhui Zhang, Webster, NY (US); Markus R. Silvestri, Fairport, NY (US); Aaron M. Stuckey, Fairport, NY (US); Manuel A. Ortiz-Casasus, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 346 days.

(21) Appl. No.: 14/685,817

(22) Filed: Apr. 14, 2015

(65) Prior Publication Data
US 2016/0306288 A1    Oct. 20, 2016

(51) Int. Cl.
| G03G 9/13 | (2006.01) |
| G03G 15/02 | (2006.01) |
| C08L 61/20 | (2006.01) |
| C08L 77/00 | (2006.01) |
| C08K 3/22 | (2006.01) |
| C08L 3/04 | (2006.01) |

(52) U.S. Cl.
CPC .......... *G03G 15/0233* (2013.01); *C08K 3/22* (2013.01); *C08L 3/04* (2013.01); *C08L 61/20* (2013.01); *C08L 77/00* (2013.01)

(58) Field of Classification Search
None
See application file for complete search history.

(56) References Cited

U.S. PATENT DOCUMENTS

| 5,689,783 | A | * | 11/1997 | Sasame | G03G 15/0812 399/274 |
| 5,925,893 | A | * | 7/1999 | Ishii | C08G 18/0819 257/40 |
| 8,090,298 | B2 | * | 1/2012 | Hoshio | G03G 15/0233 399/176 |
| 2010/0152328 | A1 | * | 6/2010 | Tseng | C08G 69/36 523/351 |
| 2011/0052252 | A1 | * | 3/2011 | Lin | G03G 15/0233 399/109 |
| 2012/0153285 | A1 | * | 6/2012 | James | H01L 51/107 257/57 |
| 2013/0170860 | A1 | * | 7/2013 | Martinkovic | G03G 15/0233 399/176 |

\* cited by examiner

*Primary Examiner* — Marc Zimmer
(74) *Attorney, Agent, or Firm* — Hoffman Warnick LLC

(57) ABSTRACT

The present teachings described a bias charging member and a method of manufacture. The bias charging member includes a conductive core and an outer surface layer disposed on the conductive core. The outer surface layer includes a water soluble polyamide resin, and a water soluble aminoplast resin.

19 Claims, 1 Drawing Sheet

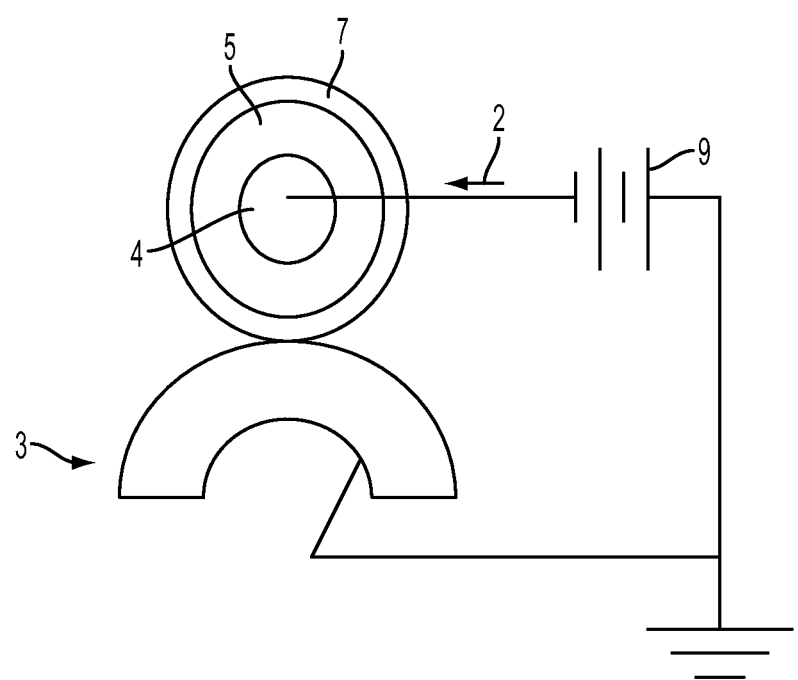

ELECTROSTATIC CHARGING MEMBER

BACKGROUND

Field of Use

The present invention relates to an electrostatic charging member, and more specifically, to an outer surface layer of an electrostatic charging member.

Background

Image forming apparatuses require electrostatic charging of an image holding member by use of an electrostatic charging member or bias charging member. Electrostatic latent images differing from their surroundings in electric potential are formed on the electrostatically charged image holding member. The electrostatic latent images are developed with a developer containing toner, and eventually transferred to a recording material.

Electrostatic charging members are devices having the function of charging electrostatically image holding members and can use contact charging method, wherein the charging member is brought into direct contact with the image holding member to perform electrostatically charge of the image holding members.

The electrostatic charging member is equipped with an electrostatic charging member, such as an electrostatic charging roll, which is brought into direct contact with the surface of an image holding member and made to rotate in synchronization with movement of the image holding member's surface, thereby giving electrostatic charges to the image holding member. The electrostatic charging roll is made up of, e.g., a base material and an elastic conducting layer formed around the peripheral surface of the base material and an outer most layer.

Presently, the outermost layer is coated onto the elastic conducting layer using a solvent and the coating is and thermally cured.

It would be desirable to provide an outermost layer that does not require solvent coating and still provides adequate performance.

SUMMARY

According to an embodiment, there is provided a bias charging member. The bias charging member includes a conductive core and an outer surface layer disposed on the conductive core. The outer surface layer includes a water soluble polyamide resin, and a water soluble aminoplast resin.

According to another embodiment, there is provided a method of manufacturing a bias charging member. The method includes mixing a water soluble polyamide resin, a water soluble aminoplast resin, an acid catalyst, a water soluble silicone copolymer wetting agent, water, carbon black and polyamide particles to obtain a dispersion. The dispersion is coated on a bias charging roll substrate. The coating is heated to form an outermost layer.

According to another embodiment, there id provided a bias charging member. The bias charging member includes a conductive core, a base material disposed on the conductive core and an outer surface layer disposed on the base material. The outer surface layer includes a polyamide resin of caprolactam, adipic acid and aminoethylpiperazine, a water soluble aminoplast resin, a water soluble silicone copolymer wetting agent, an acid catalyst, a surface roughness control agent and carbon black.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIG. 1 demonstrates an illustrative bias charging roll (BCR) having an electrically conductive core and an outer surface layer provided thereon.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Referring to FIG. 1, there is shown an embodiment having a bias charging roller (BCR) 2 held in contact with an image carrier implemented as a photoconductive member 3. However, embodiments herein can be used for charging a dielectric receiver or other suitable member to be charged. The photoconductive member 3 may be a drum, a belt, a film, a drelt (a cross between a belt and a drum) or other known photoconductive member. While the BCR 2 is in rotation, a DC voltage and optional AC current is applied from a power source 9 to an electro-conductive core 4 of the BCR 2 to cause it to charge the photosensitive member 3. Shown in FIG. 1, the electro-conductive core 4 is surrounded by a base material 5. Although shown as one layer, it is possible to eliminate the base material 5 or have multiple layers of base material 5. These layers are referred to as base layers, intermediate layers or substrate layers. The base material 5 for the BCR 2 can be any elastic material with semiconductive dopant of suitable fillers discussed below. A conductive protective overcoat is provided on the base material 5 of the BCR 2 to form the outer surface layer 7. There may or may not be a filler in the substrate layer, intermediate layer, and outer layer.

The electro-conductive core 4 serves as an electrode and a supporting member of the charging roll, and is composed of an electro-conductive material such as a metal or alloy of aluminum, copper alloy, stainless steel or the like; iron coated with chromium or nickel plating; an electro-conductive resin and the like. The diameter of the electro-conductive core is, for example, about 1 mm to about 20 cm, or from about 5 mm to about 2 cm.

The base material 5 can be isoprene rubber, chloroprene rubber, epichlorohydrin rubber, butyl rubber, polyurethane, silicone rubber, fluorine rubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer copolymer rubber (EPDM), acrylonitrile-butadiene copolymer rubber (NBR), natural rubber, and blends thereof. Among these, polyurethane, silicone rubber, EPDM, epichlorohydrin-ethylene oxide copolymer rubber, epichlorohydrin-ethylene oxide-allyl glycidyl ether copolymer rubber, NBR, and blends thereof are preferably used.

An electro-conductive agent, an electronic electro-conductive agent or an ionic electro-conductive agent may be used in the base materials. Examples of the electronic electro-conductive agent include fine powder of: carbon black such as Ketjen Black and acetylene black; pyrolytic carbon, graphite; various kinds of electro-conductive metal or metal alloy such as aluminum, copper, nickel and stainless steel; various kinds of electro-conductive metal oxide such as tin oxide, indium oxide, titanium oxide, tin oxide-antimony oxide solid solution, and tin oxide-indium oxide solid solution; insulating materials having a surface treated by an electro-conductive process; and the like. Furthermore, examples of the ionic electro-conductive agent include perchlorates or chlorates of tetraethylammonium, lauryltrimethyl ammonium and the like; perchlorates or chlorates of alkali metal such as lithium and magnesium, and alkali earth metal; and the like. These electro-conductive agents may be used alone, or in combination of two or more kinds thereof.

Furthermore, the amount of addition to the base materials is not particularly limited. For example, the amount of electro-conductive agent to be added is from about 1 to about 30 parts by weight, or from about 5 to about 25 parts by weight with respect to 100 parts by weight of the rubber material. The amount of the ionic electro-conductive agent to be added is in the range of about 0.1 to about 5.0 parts by weight, or from about 0.5 to about 3.0 parts by weight with respect to 100 parts by weight of the rubber material. The layer thickness of the base material is from about 1 mm to about 20 cm, or from about 5 mm to about 3 cm.

The outer surface layer or protective overcoat layer 7 contains a polyamide resin, and an aminoplast resin. The polyamide resin and aminoplast resin are coated from an aqueous solution and cured. The outer layer thickness of the outer surface layer is from about 0.1 μm to about 500 μm, or from about 1 μm to about 50 μm.

The water soluble polyamide resin is a copolyamide of caprolactam, adipic acid and aminoethylpiperazine. Embodiments of the watersoluble polyamide resin include AQ NYLON® A-90 obtained from TORAY. Other water soluble polyamide resins that can be used in the outermost layer include alkylene oxide-modified Nylon 6 such as AQ NYLON® P-70, P-95; and amine/alkylene oxide-modified Nylon 6 such as AQ NYLON® T-70, all obtained from TORAY.

The water soluble aminoplast resin is one of a water soluble melamine formaldehyde resin, a water soluble urea formaldehyde resin, a water soluble benzoguanamine formaldehyde resin, or a water soluble glycoluril formaldehyde resin. Examples of melamine formaldehyde co-resin include CYMEL® 373 and other water soluble melamine formaldehyde resins, obtained from Allnex.

In embodiments, the melamine formaldehyde resins and the benzoguanamine formaldehyde resins include methylol-type resins in which methylol groups are present as they are, full ether-type resins in which all the methylol groups are alkyl-etherified, full imino-type resins, and methylol-imino mixture-type resins may be used. Of these resins, ether-type resins are preferred over the others in point of stability in coating solutions. In embodiments, the water soluble aminoplast resin is a water soluble resin is represented by:

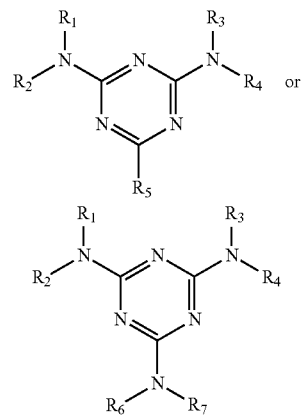

and mixtures thereof, wherein, each of $R_1$ to $R_7$ represents H, $CH_2OH$ or an alkyl ether group.

The outer surface layer can contain, in addition to the polyamide resin and the aminoplast resin, a wetting agent, a conductive component, a surface roughness control agent, and an acid catalyst, where the polyamide resin is present in an amount of from about 30 to about 80 weight percent, the aminoplast resin is present in an amount of from about 5 to about 15 weight percent, the wetting agent is present from about 0.1 to about 5 weight percent, the conductive component is present in an amount of from about 5 to about 40 weight percent, the surface roughness control agent is present in an amount of from about 5 to about 30 weight percent, and the acid catalyst is present in an amount of from about 0.1 to about 5 weight percent, and the total is 100 weight percent.

In embodiments, the wetting agent is a water soluble silicone copolymer. Silicone copolymer wetting agents that can be used in the outermost layer include SILWET® L-7230 and other water soluble silicone copolymers, obtained from Momentive Performance Materials, Inc.

In embodiments, the conductive component can include carbon black, a metal oxide, or a conductive polymer. Examples of the conductive component include fine powder of: carbon black such as Ketjen Black and acetylene black; pyrolytic carbon, graphite; various kinds of electro-conductive metal or metal alloy such as aluminum, copper, nickel and stainless steel; various kinds of electro-conductive metal oxide such as tin oxide, indium oxide, titanium oxide, tin oxide-antimony oxide solid solution, and tin oxide-indium oxide solid solution; insulating materials having a surface treated by an electro-conductive process; and the like. Furthermore, examples of conductive polymers include polythiophene, polyaniline, polypyrrole, polyacetylene and the like. These electro-conductive agents may be used alone, or in combination of two or more kinds thereof. The amount of conductive component in the outer surface is from 0.1 to about 60 weight percent based on the weight of total solids in the outer surface layer. The carbon black conductive components that can be incorporated into the outermost layer include MONARCH® 1000, EMPEROR® E1800, both obtained from Cabot Corp.

In embodiments the surface roughness control agent includes polyamide particles. The polyamide particles have an average diameter of from 2 microns to 20 microns. The polyamide suitable as a surface roughness control agent include ORGASOL® 2001UDNAT1 (average diameter of about 5 microns), 2001EXDNAT1 (average diameter of about 10 microns), or 2002DNAT1 (average diameter of about 20 microns), all obtained from Arkema.

Examples of an acid catalyst suitable for the outer layer include aliphatic carboxylic acids, such as acetic acid, chloroacetic acid, trichloroacetic acid, trifluoroacetic acid, oxalic acid, maleic acid, malonic acid, lactic acid and citric acid; aromatic carboxylic acids, such as benzoic acid, phthalic acid, terephthalic acid and trimellitic acid; aliphatic and aromatic sulfonic acids, such as methanesulfonic acid, dodecylsulfonic acid, benzenesulfonic acid, dodecylbenzenesulfonic acid, naphthalenesulfonic acid, p-toluenesulfonic acid, dinonylnaphthalenesulfonic acid (DNNSA), dinonylnaphthalenedisulfonic acid (DNNDSA) and phenolsulfonic acid; and phosphoric acid.

The bulk and surface conductivity of the outer surface layer 7 should be higher than that of the BCR 2 to prevent electrical drain on the BCR 2, but only slightly more conductive. Surface layers 7 with from about $1\times10^2$ ohm/to about $1\times10^{12}$ ohm/, of from about $1\times10^4$ ohm/to about $1\times10^8$ ohm/, or from about $1\times10^5$ ohm/to about $1\times10^6$ ohm/surface resistivity were found to be suitable.

The surface roughness ($R_z$) of the outermost layer is in a range of about 2 microns to about 20 microns, or in embodiments in a range of about 4 microns to about 18 microns or in a range of about 8 microns to about 15 microns. By controlling the surface roughness $R_z$ of the outermost layer to the 2 micron to 20 micron range, the durability of the electrostatic charging member is improved, and outstanding long-term retention of electrostatic charging capability is achieved.

A dispersion of a polyamide resin, an aminoplast resin is prepared by ball milling the aminoplast resin and in polyamide resin in water with the conductive material. A catalyst is added to the dispersion to lower the curing temperature and is optional. Polyamide particles can be added to control the outer surface roughness. The dispersion is then coated on the BCR 2. The coating is cured at a temperature of about 25 to about 200° C., or from about 100 to about 180° C., for about 10 to about 120 minutes, or from about 25 to 65 minutes. Typical coating techniques include dip coating, roll coating, spray coating, rotary atomizers, ring coating, die casting, flow coating and the like.

EXAMPLES

Experimentally, an outermost layer dispersion was prepared as follows: AQ NYLON® A-90 (a water-soluble copolyamide resin from Toray), CYMEL® 373 (a water-soluble melamine formaldehyde resin from Allnex), p-toluenesulfonic acid, and SILWET® L-7230 (a modified polydimethylsiloxane from Momentive Performance Materials) were mixed in water (about 11 weight percent solids) via agitation to obtain a polymeric base solution. MONARCH® 1000 (a carbon black available from CABOT) and ORGASOL® 2001UDNAT1 (a polyamide particle from Arkema) were added to the polymeric base solution, and ball milled with 2 mm stainless steel shots for 20 hours using a paint shaker to form a dispersion. The dispersion (AQ NYLON® A-90/CYMEL® 373/MONARCH® 1000/ORGASOL® 2001UDNAT1/p-toluenesulfonic acid/SILWET® L-7230=40.7/27.1/9.5/20.3/2.0/0.4 in water, about 16 wt % solid) was filtered through a paint filter to obtain the final outermost layer coating dispersion. The coating dispersion was coated onto an Olympia BCR using a Tsukiage coater and subsequently cured at 180° C. for 30 minutes to obtain a 10 micron thick outermost layer.

The BCR outermost layer was tested for some key physical properties including surface resistivity of about $1.3\times10^7$ ohm/sq, and the surface roughness $R_z$ of about 9.5 microns.

The resulting overcoated BCR was continuously print tested in a Xerox C75 printer in B zone up to 300k. Prints were sampled every 12,000 prints and tested for Mottle, Graininess, Background, TRC, SAD Line Width, visual bands and streaks. Process data was also collected at the same interval. The BCR was used to achieve a target $V_{hi}$ on the photoreceptor. The disclosed overcoated BCR performed (over the life of the cartridge) comparable to BCRs having a solvent coated outermost layer in the C75 printer. No charging streaks and BCR contamination were found throughout the life of test.

The after-test BCR was re-tested for key physical properties. The thickness of the outermost layer remained unchanged, which indicated a robust coating layer. The surface roughness of the outermost layer was reduced from about 9.5 microns to about 7.0 microns.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:
1. A bias charging member comprising:
   a) a conductive core, and
   b) an outer surface layer disposed on the conductive core, the outer surface layer comprising:
      a water soluble polyamide resin, a wetting agent comprising a water soluble silicone copolymer and a water soluble aminoplast resin.

2. The bias charging member in accordance with claim 1, wherein the outer surface layer further comprises a conductive component, a surface roughness control agent, and a catalyst.

3. The bias charging member in accordance with claim 2, wherein the conductive component is selected from the group consisting of: carbon black, metal oxides, and conductive polymers.

4. The bias charging member in accordance with claim 2, wherein the catalyst is an acid selected from the group consisting of: aliphatic carboxylic acids and aromatic carboxylic acids and aromatic sulfonic acids.

5. The bias charging member in accordance with claim 2, wherein the surface roughness control agent comprises polyamide particles.

6. The bias charging member in accordance with claim 5, wherein the polyamide particles have an average diameter of from about 2 microns to about 20 microns.

7. The bias charging member in accordance with claim 1, wherein the water soluble polyamide resin is a copolyamide of caprolactam, adipic acid and aminoethylpiperazine.

8. The bias charging member in accordance with claim 1, wherein the water soluble aminoplast resin is one of a water soluble melamine formaldehyde resin, a water soluble urea formaldehyde resin, a water soluble benzoguanamine formaldehyde resin, or a water soluble glycoluril formaldehyde resin.

9. The bias charging member in accordance with claim 8, wherein the water soluble aminoplast resin is represented by:

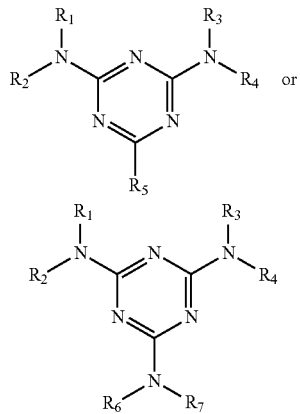

and mixtures thereof, wherein, each of $R_1$ to $R_7$ represents H, $CH_2OH$ or an alkyl ether group.

10. The bias charging member in accordance with claim 2, wherein the conductive component is a carbon black, a metal oxide, or a conductive polymer comprising from about 0.1 to about 60 percent by weight based on the weight of total solids of the outer surface layer.

11. The bias charging member in accordance with claim 1, further comprising a base material disposed between the conductive core and the outer surface layer.

12. The bias charging member in accordance with claim 11, wherein the base material is selected from the group consisting of: isoprene rubber, chloroprene rubber, epichlorohydrin rubber, butyl rubber, polyurethane, silicone rubber, fluorine rubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer copolymer rubber, acrylonitrile-butadiene copolymer rubber (NBR) and natural rubber.

13. A method of manufacturing a bias charging member comprising:
    mixing a water soluble polyamide resin, a water soluble aminoplast resin, an acid catalyst, a water soluble silicone copolymer wetting agent, water, carbon black and polyamide particles to obtain a dispersion;
    coating the dispersion on a bias charging roll substrate; and
    heating the coating to form an outermost layer.

14. The method of claim 13, wherein the carbon black comprises an amount from about 1 to about 30 percent by weight based on the weight of total solids of the outermost layer.

15. The method of claim 13, wherein the bias charging roll substrate comprises a base material disposed over a conductive core.

16. The method of claim 15, wherein the base material is selected from the group consisting of: isoprene rubber, chloroprene rubber, epichlorohydrin rubber, butyl rubber, polyurethane, silicone rubber, fluorine rubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer copolymer rubber, acrylonitrile-butadiene copolymer rubber (NBR) and natural rubber.

17. The method of claim 13, wherein the heating is at about 100-200° C. for about 10-180 minutes.

18. A bias charging member comprising:
    a) a conductive core,
    b) a base material disposed on the conductive core; and
    c) an outer surface layer disposed on the base material comprising a polyamide resin of caprolactam, adipic acid and aminoethylpiperazine, a water soluble aminoplast resin, a water soluble silicone copolymer wetting agent, an acid catalyst, a surface roughness control agent and carbon black.

19. The bias charging member of claim 18, wherein the base material is selected from the group consisting of: isoprene rubber, chloroprene rubber, epichlorohydrin rubber, butyl rubber, polyurethane, silicone rubber, fluorine rubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer copolymer rubber, acrylonitrile-butadiene copolymer rubber (NBR) and natural rubber.

* * * * *